United States Patent
Johnson et al.

(10) Patent No.: US 10,138,850 B2
(45) Date of Patent: Nov. 27, 2018

(54) INTEGRATED FUEL AND COOLING CIRCUIT FOR AN INTERNAL COMBUSTION ENGINE

(71) Applicant: AVL Powertrain Engineering, Inc., Plymouth, MI (US)

(72) Inventors: Gustav R. Johnson, Canton, MI (US); Julian Sherborne, Novi, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 218 days.

(21) Appl. No.: 15/050,828

(22) Filed: Feb. 23, 2016

(65) Prior Publication Data

US 2016/0252056 A1    Sep. 1, 2016

Related U.S. Application Data

(60) Provisional application No. 62/121,901, filed on Feb. 27, 2015.

(51) Int. Cl.
  *F02M 37/00*  (2006.01)
  *F02M 31/14*  (2006.01)
  (Continued)

(52) U.S. Cl.
  CPC ............ *F02M 31/145* (2013.01); *F01P 3/00* (2013.01); *F02D 41/3082* (2013.01); *F02M 37/0052* (2013.01); *F01P 2003/005* (2013.01)

(58) Field of Classification Search
  CPC ............ F02M 31/145; F02M 37/0052; F02D 41/3082; F01P 3/00; F02P 2003/005
  (Continued)

(56) References Cited

U.S. PATENT DOCUMENTS 1,480,402 A * 1/1924 Krollage ............... F02M 15/02
                                                   123/41.15
1,896,401 A   2/1933 Godward
              (Continued)

FOREIGN PATENT DOCUMENTS

AT      410244 B      3/2003
DE    19900132 A1     7/2000
FR     2373678 A1     7/1978

OTHER PUBLICATIONS

Extended European Search Report for Application No. 16157523.8 dated Jun. 28, 2016.

*Primary Examiner* — Marguerite McMahon
(74) *Attorney, Agent, or Firm* — Harness, Dickey & Pierce, P.L.C.

(57) ABSTRACT

A cooling system for an internal combustion engine according to the principles of the present disclosure includes an engine block, a compression device, a cooling circuit, a first pump, and a fuel delivery device. The engine block at least partially defines a combustion chamber and a cooling passage. The cooling passage extends through the engine block. The compression device is received in the engine block to partially define the combustion chamber. The compression device is movable within and relative to the engine block. The cooling circuit is in fluid communication with the cooling passage. The first pump is in fluid communication with the cooling circuit and is configured to circulate a fuel through the cooling circuit and the cooling passage. The fuel delivery device is in fluid communication with the cooling circuit and is configured to deliver the fuel to the combustion chamber.

32 Claims, 3 Drawing Sheets

(51) Int. Cl.
*F01P 3/00* (2006.01)
*F02D 41/30* (2006.01)

(58) Field of Classification Search
USPC .. 123/557, 41.42, 41.72, 41.05, 41.09, 41.1,
123/41.28
See application file for complete search history.

(56) References Cited

U.S. PATENT DOCUMENTS

| | | | | |
|---|---|---|---|---|
| 4,475,340 A | * | 10/1984 | Tseng | F02B 35/02 123/557 |
| 2009/0320774 A1 | * | 12/2009 | Liebsch | F02D 19/0615 123/41.42 |
| 2011/0132320 A1 | * | 6/2011 | Ulrey | F02D 41/005 123/299 |
| 2014/0116390 A1 | | 5/2014 | Foege | |
| 2016/0376978 A1 | * | 12/2016 | Gonze | F01P 7/167 123/41.1 |
| 2017/0002721 A1 | * | 1/2017 | Naik | F04B 49/02 |

* cited by examiner

INTEGRATED FUEL AND COOLING CIRCUIT FOR AN INTERNAL COMBUSTION ENGINE

CROSS-REFERENCE TO RELATED APPLICATIONS

This application claims the benefit of U.S. Provisional Application No. 62/121,901, filed on Feb. 27, 2015. The entire disclosure of the above application is incorporated herein by reference.

FIELD

The present disclosure relates to cooling and fuel circuits for an internal combustion engine, and more particularly, to an integrated fuel and cooling circuit for an internal combustion engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine typically includes a fuel system and a separate cooling system. The fuel system typically includes a fuel tank configured to hold a fuel, such as diesel, or gasoline for example, a fuel pump, and a fuel delivery device, such as a fuel injector for example. The fuel pump pumps the fuel from the fuel tank to the fuel delivery device. The fuel delivery device controls the timing and amount of fuel supplied either directly to the combustion chamber of the piston engine or to a flow of air before the air enters the combustion chamber. The air-fuel mixture is then compressed and ignited within the combustion chamber to move the piston and do work, such as turn a crankshaft for example. The fuel received from the fuel tank is typically relatively cold in relation to the boiling point of the fuel. Accordingly, a considerable amount of energy is required to vaporize and combust the relatively cold fuel.

The cooling system typically includes a coolant pump, a heat exchanger, a reservoir, and a series of passages within the engine block. The coolant pump pumps a coolant fluid from the reservoir through the passages in the engine block where the coolant fluid absorbs heat from the engine block. The heated coolant fluid then passes through the heat exchanger to expel heat from the coolant fluid to the atmosphere or another fluid in contact with the heat exchanger. The coolant fluid then returns again to the passages in the engine block. The coolant fluid typically continues endlessly along this cycle. The coolant fluid is a fluid, such as water or a refrigerant for example, that is distinctly different from the fuel burned in the combustion chamber and remains entirely separate from the fuel system and the combustion chamber. Cooling systems can be costly, complex, and can add to the size and weight of the piston engine.

SUMMARY

This section provides a general summary of the disclosure, and is not a comprehensive disclosure of its full scope or all of its features.

A first example of a cooling system for an internal combustion engine according to the principles of the present disclosure includes an engine block, a compression device, a cooling circuit, a first pump, and a fuel delivery device. The engine block at least partially defines a combustion chamber and a cooling passage. The cooling passage extends through the engine block. The compression device is received in the engine block to partially define the combustion chamber. The compression device is movable within and relative to the engine block. The cooling circuit is in fluid communication with the cooling passage. The first pump is in fluid communication with the cooling circuit and configured to circulate a fuel through the cooling circuit and the cooling passage. The fuel delivery device is in fluid communication with the cooling circuit and configured to deliver the fuel to the combustion chamber.

In one aspect, the cooling system further includes a fuel tank and a supply conduit. The cooling circuit includes a first conduit and a second conduit. The first conduit is fluidly coupled to an inlet of the cooling passage. The second conduit is fluidly coupled to an outlet of the cooling passage. The supply conduit is coupled to the cooling circuit to supply fuel from the fuel tank to the first conduit.

In another aspect, the cooling system further includes a heat exchanger in fluid communication with the cooling circuit. The heat exchanger is configured to receive fuel from the second conduit.

In another aspect, the fuel delivery device is fluidly coupled to the cooling circuit between the heat exchanger and the first conduit.

In another aspect, the fuel delivery device is fluidly coupled to the cooling circuit between the outlet of the cooling passage and the heat exchanger.

In another aspect, the cooling system further includes a thermostat fluidly coupled to the cooling circuit between the outlet of the cooling passage and the heat exchanger.

In another aspect, the cooling system further includes a second pump in fluid communication with the supply conduit and configured to pump fuel from the fuel tank to the cooling circuit.

In another aspect, the second conduit is fluidly coupled to the fuel tank to return fuel to the fuel tank.

In another aspect, the fuel delivery device is fluidly coupled to the second conduit between the cooling passage and the fuel tank.

In another aspect, the cooling system further includes a second pump fluidly coupled between the cooling circuit and the delivery device.

In another aspect, the cooling system further includes a control module configured to control a flow rate of the first pump based on an operating temperature of the engine.

In another aspect, the cooling passage surrounds at least a portion of the combustion chamber.

In another aspect, the fuel delivery device is configured to deliver the fuel to a mixing chamber that is fluidly coupled to the combustion chamber.

In another aspect, the fuel delivery device is configured to deliver the fuel directly into the combustion chamber.

A second example of a cooling system for an internal combustion engine includes an engine block, a heat exchanger, a cooling circuit, a fuel tank, a supply conduit, a first pump, and a fuel delivery device. The engine block at least partially defines a combustion chamber and a cooling passage. The cooling passage has an inlet and an outlet and extends through the engine block. The heat exchanger has an inlet and an outlet. The cooling circuit includes a first conduit, a second conduit, and a third conduit. The first conduit is coupled to the inlet of the cooling passage. The second conduit is coupled to the outlet of the cooling passage and the inlet of the heat exchanger. The third conduit is coupled to the first conduit and the outlet of the heat exchanger. The fuel tank is configured to hold a volume of a fuel. The supply conduit is coupled to the fuel tank and the first conduit. The first pump is configured to circulate the fuel through the cooling circuit. The fuel delivery device is in fluid communication with the cooling circuit and configured to deliver the fuel to the combustion chamber.

in one aspect, the fuel delivery device is fluidly coupled to the cooling circuit downstream of the heat exchanger and upstream of the first conduit.

In another aspect, the fuel delivery device is fluidly coupled to the cooling circuit downstream of the cooling passage and upstream of the heat exchanger.

In another aspect, the cooling system further includes a thermostat fluidly coupled between the outlet of the cooling passage and the inlet of the heat exchanger.

In another aspect, the cooling system further includes a second pump in fluid communication with the supply conduit and configured to pump the fuel from the fuel tank to the cooling circuit.

In another aspect, the cooling system further includes a second pump fluidly coupled between the cooling circuit and the delivery device.

In another aspect, the cooling system further includes a control module configured to control a flow rate of the first pump based on an operating temperature of the engine.

In another aspect, the cooling passage surrounds at least a portion of the combustion chamber.

In another aspect, the fuel delivery device is configured to deliver the fuel to a mixing chamber that is fluidly coupled to the combustion chamber.

In another aspect, the fuel delivery device is configured to deliver the fuel directly into the combustion chamber.

In another aspect, the cooling system further includes a cylinder head coupled to the engine block and at least partially defining a second cooling passage.

An example method for cooling an internal combustion engine includes circulating fuel through a cooling circuit, removing a portion of the fuel from the cooling circuit, supplying the portion of the fuel to a combustion chamber of the engine, and combusting the portion of the fuel in the combustion chamber. Circulating fuel through the cooling circuit includes the steps of flowing the fuel through a cooling passage to transfer heat from the engine to the fuel, flowing the fuel from the cooling passage to a heat exchanger to release heat from the fuel, and flowing the fuel from the heat exchanger to the cooling passage. The cooling passage is defined by at least one of an engine block and a cylinder head of the engine.

In one aspect, the method further includes supplying an additional amount of fuel from a fuel tank to the cooling circuit.

In another aspect, the method further includes mixing the additional amount of fuel with the fuel that is within the cooling circuit before flowing the fuel through the cooling passage.

In another aspect, the method further includes controlling a flowrate of the fuel in the cooling circuit based on an operating temperature of the engine.

Further areas of applicability will become apparent from the description provided herein. The description and specific examples in this summary are intended for purposes of illustration only and are not intended to limit the scope of the present disclosure

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure uses a common fluid to cool the engine assembly, pre-heat the fluid, and supply the fluid to the combustion chamber for combustion of the fluid as the working fuel of the piston engine. The fuel is circulated through the engine block and around the piston cylinders to absorb heat from the engine block. The fuel is then circulated outside the engine block where the fuel releases the heat. Some of the heated fuel is removed and supplied to the combustion chamber for combustion. Heat from the fuel that is combusted is also expelled through the exhaust valve.

Figure 1:
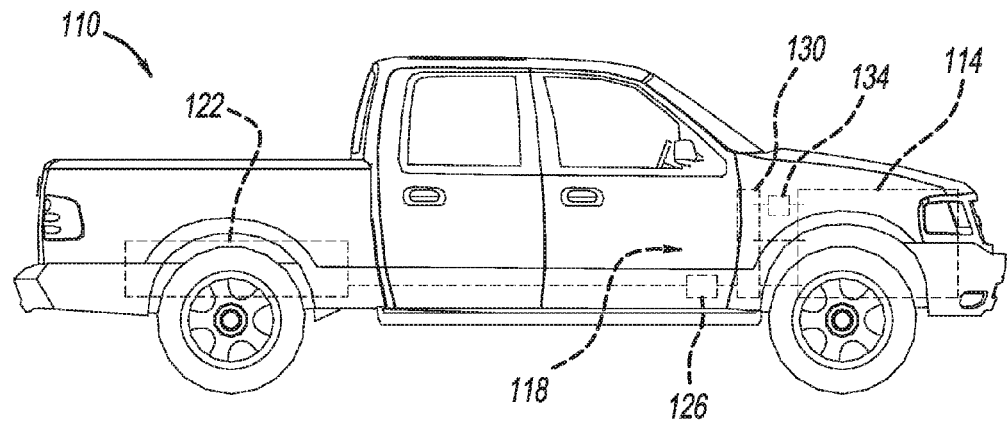
FIG. 1 is a side view of a representative vehicle including a piston engine and a fuel system according to the principles of the present disclosure.

Referring to FIG. 1, a representative vehicle 110 is illustrated including an internal combustion engine 114 and a fuel/cooling system 118. The vehicle 110 is illustrated only for representative purposes as one example of an application of the engine 114 and the fuel/cooling system 118. It is understood that the engine 114 and the fuel/cooling system 118 can be used in any suitable application that uses an internal combustion engine, such as other types of vehicles, electrical generators, or machinery for example. While illustrated and described herein as used with a piston style engine 114, it is also understood that the fuel/cooling system 118 of the present disclosure can be used in other types of internal combustion engines, such as a rotary, Wankel or turbine type engine for example.

The fuel/cooling system 118 can include a fuel tank 122, a first pump 126, a cooling circuit 130, and a fuel delivery system 134. The fuel tank 122 can be any suitable container configured to hold a liquid fuel, such as diesel or gasoline for example. The fuel tank 122 can be spaced apart from the engine 114 and, in the particular example provided, the fuel tank 122 is located toward the rear of the vehicle 110. The fuel tank 122 is coupled for fluid communication with the engine 114, the first pump 126, the cooling circuit 130, and the fuel delivery system 134 as will be described below.

Figure 2:
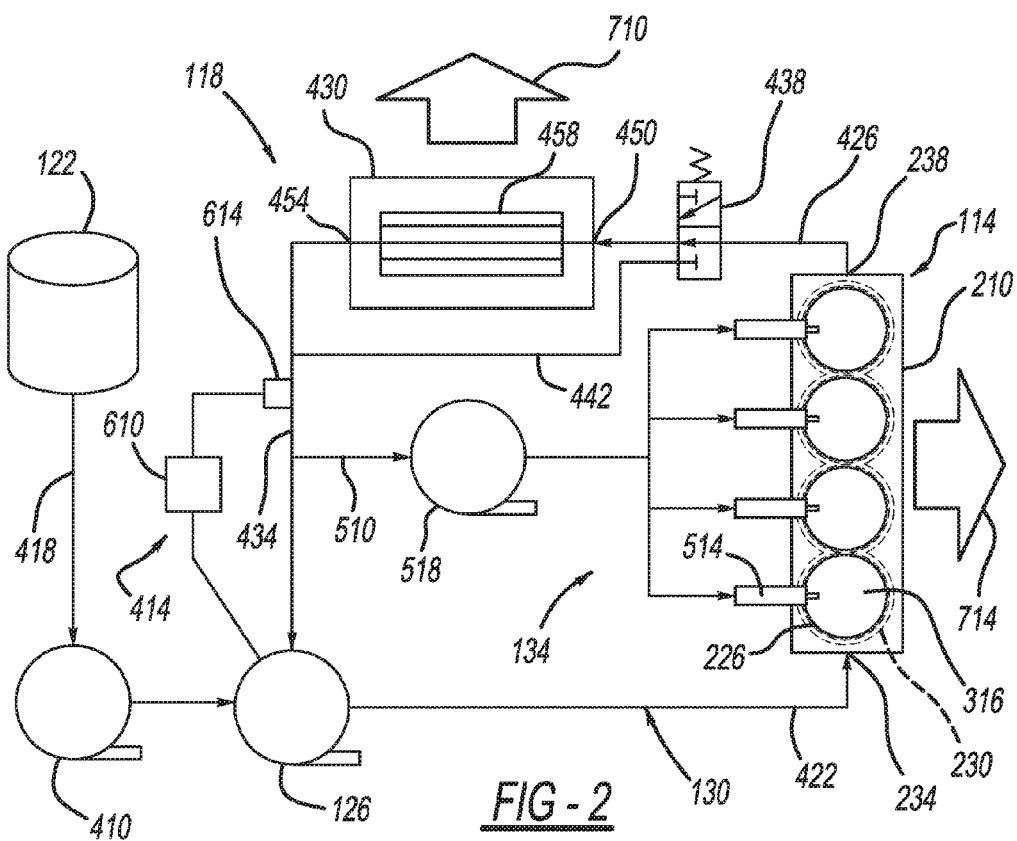
FIG. 2 is a schematic of the piston engine and fuel system of FIG. 1 illustrated in more detail.
Figure 3:
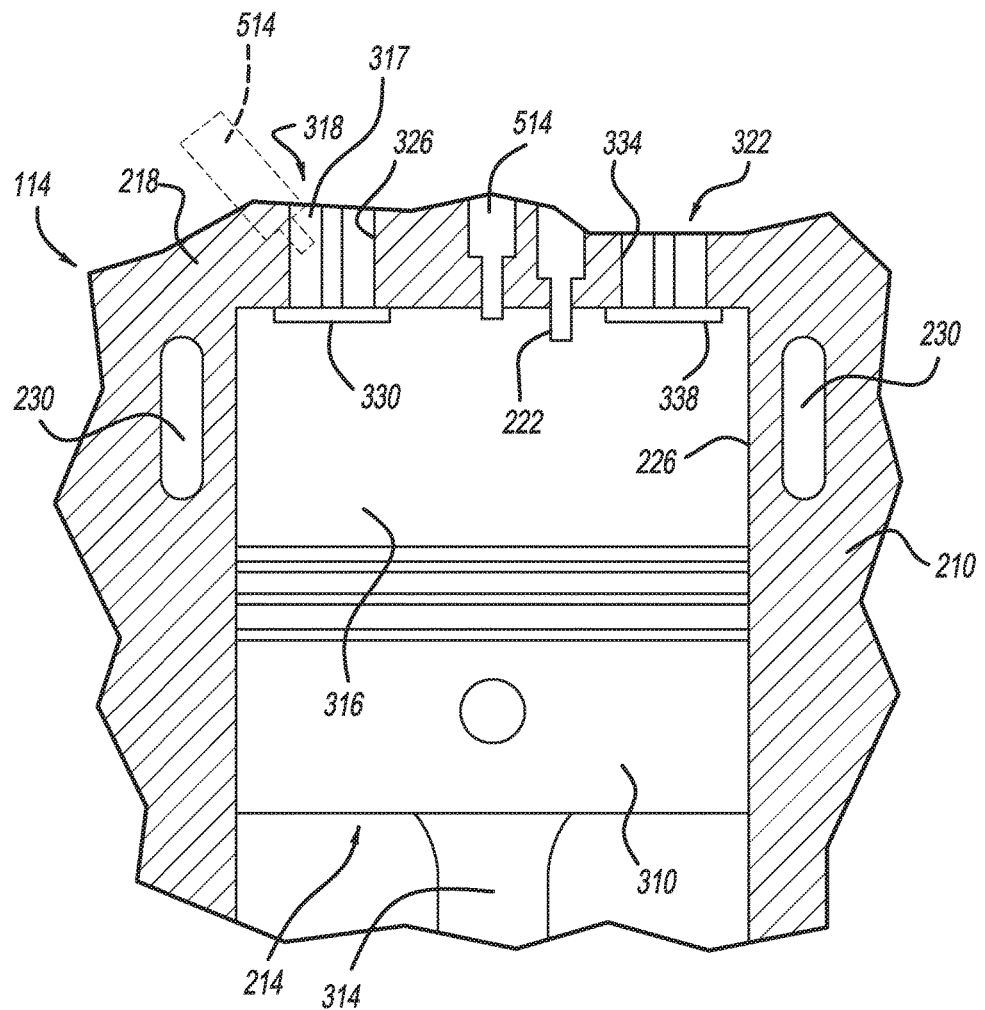
FIG. 3 is a sectional view of a combustion chamber of the piston engine of FIG. 2 illustrated in more detail.

With additional reference to FIGS. 2 and 3, the engine 114 and the fuel/cooling system 118 are illustrated in greater detail. The engine 114 includes an engine block 210, and an energy conversion mechanism 214. The engine 114 can also include a cylinder head 218 and an ignition device 222. The engine block 210 defines a piston cylinder 226 and a cooling passage 230. The piston cylinder 226 is a cylindrically shaped cavity. While not specifically shown, the engine block 210 can include a cylinder sleeve that can define the piston cylinder 226. In the particular example provided, the engine 114 is illustrated as an inline four-cylinder compression-ignition engine. It is understood that the engine 114 can be another type of engine such as a spark-ignition engine for example. It is also understood that other numbers of cylinders or configurations can be used, such as a single cylinder, a V-8 engine, or an opposed piston engine for example. While the engine 114 is described herein as a four-stroke engine, other types, such as a two-stroke engine could be used. The cooling passage 230 has an inlet 234 and an outlet 238 and extends through the engine block 210 between the inlet 234 and outlet 238. The cooling passage 230 extends through the engine block 210 adjacent to the perimeter of the piston cylinders 226 and can surround at least a portion of each piston cylinder 226. The cooling passage 230 can also extend through the cylinder head 218 in a location that is adjacent to or partially surrounding the perimeter of the piston cylinders 226. Alternatively or additionally, a second cooling passage (not specifically shown) that is in fluid communication with the cooling passage 230 can extend through the cylinder head 218 in a location that is adjacent to or partially surrounding the perimeter of the piston cylinders 226. The cooling passage 230 can extend completely or partially around the sides of each piston cylinder 226. The cooling passage 230 can have an annular or toroidal shape that can be generally concentric with the piston cylinder 226 where the cooling passage 230 extends around the piston cylinder 226.

The energy conversion mechanism 214 converts combustion energy into mechanical motion. The energy conversion mechanism 214 can include a compression device 310, and an output member (not shown). The compression device 310 can be received in the engine block 210 and movable therein to compress an air fuel mixture within the engine block. In the example provided, the energy conversion mechanism 214 is a piston assembly and the compression device 310 is a piston, though other devices can be used. For example, the compression device can be the rotor of a rotary engine, or a turbine blade of a turbine engine. In the example provided, the piston 310 is slidably received in the piston cylinder 226 and a connecting rod 314 couples the piston 310 to the output member (i.e. a crankshaft). The crankshaft is rotationally supported within the engine and configured such that linear motion of the piston 310 within the piston cylinder 226 is converted to rotational motion of the crankshaft. The cylinder head 218, piston cylinder 226, and piston 310 define a combustion chamber 316.

The cylinder head 218 can be mounted to the engine block 210 or can be integrally formed with the engine block 210. The cylinder head 218 includes an intake valve 318 and an exhaust valve 322. The intake valve 318 includes an intake valve port 326 and an intake valve element 330, such as a poppet valve for example. The intake valve element 330 is movable relative to the intake valve port 326 between an open position and a closed position. In the open position, intake air (not specifically shown) can flow into the combustion chamber 316 through the intake valve port 326. In the closed position, the intake valve element 330 can inhibit fluid communication through the intake valve port 326. The exhaust valve 322 includes an exhaust valve port 334 and an exhaust valve element 338. The exhaust valve element 338 is movable relative to the exhaust valve port 334 between an open position and a closed position. In the closed position, the exhaust valve element 338 can inhibit fluid communication through the exhaust valve port 334. In the open position, combustion products can flow from the combustion chamber 316, through the exhaust valve port 334, to an exhaust system (not specifically shown) of the engine 114. When the intake valve 318 is open, the intake air can flow into the combustion chamber 316 during an intake stroke of the piston 310. When both the intake and exhaust valves 318, 322 are closed, the piston 310 can compress an air-fuel mixture within the combustion chamber 316 during a compression stroke of the piston 310. After ignition of the air-fuel mixture, the expansion of combustion gasses can move the piston 310 to rotate the crankshaft during a power stroke of the piston 310. Rotation of the crankshaft can then move the piston 310 through an exhaust stroke to expel the combustion gasses from the combustion chamber 316, through the exhaust valve 322 when the exhaust valve 322 is open.

The ignition device 222 can be coupled to the cylinder head 218 and can be received in the combustion chamber 316 or a pre-combustion chamber (not shown) where air and fuel mix before entering the combustion chamber 316. The ignition device 222 can be any suitable type of ignition device configured to facilitate the ignition of a compressed mixture of air and fuel within the combustion chamber when the heat of compression would otherwise be insufficient to cause combustion, such as a glow plug in a diesel engine or a spark plug in a gasoline engine for example.

As described above, the fuel/cooling system 118 includes the fuel tank 122, the first pump 126, the cooling circuit 130, and the fuel delivery system 134. The fuel/cooling system 118 can also include a second pump 410, and a control system 414. The fuel tank 122 is fluidly coupled to the cooling circuit 130 by a supply conduit 418 configured to supply fuel from the fuel tank 122 to the cooling circuit 130. The cooling circuit 130 can include a first conduit 422, the cooling passage 230, a second conduit 426, a heat exchanger 430 (e.g. a radiator) and a third conduit 434. The cooling circuit 130 can also include a thermostat 438 and a bypass conduit 442. The first conduit 422 can be coupled to the inlet 234 of the cooling passage 230 and configured to supply fuel to the cooling passage 230. The second conduit 426 can be coupled to the outlet 238 of the cooling passage 230 and configured to receive fuel exiting the cooling passage 230.

The heat exchanger 430 has an inlet 450, an outlet 454, and a plurality of tubes 458 fluidly coupling the inlet 450 and outlet 454. The heat exchanger 430 is configured to permit fuel to flow through the tubes 458 between the inlet 450 and outlet 454 while a second fluid, such as ambient or forced air for example flows across the tubes 458 to remove heat from the fuel. The heat exchanger 430 can be any suitable type, such as a radiator or shell-tube type for example. The tubes 458 can extend between the inlet 450 and outlet 454 in any suitable path. For example, the tubes can flow across the heat exchanger 430 (e.g. a cross-flow heat exchanger), or in a serpentine path across the heat exchanger 430. A plurality of fins (not shown) can be coupled to the tubes 458 and extend between the tubes 458 to absorb heat from the fuel flowing within the tubes 458 and aid in transfer of the heat to the second fluid. Similarly, the second fluid can flow across or between the tubes 458 in a direct or serpentine path through the heat exchanger 430. The third conduit 434 can be coupled to the outlet 454 of the heat exchanger 430 to receive fuel from the heat exchanger 430. The third conduit 434 can be coupled to the first conduit 422 to supply fuel to the first conduit 422.

The first pump 126 can be any type of pump suitable for pumping fuel and can be operated by an electrical motor (not shown) or can be mechanically driven, such as by connection to the crankshaft (not shown) for example. The first pump 126 is coupled to the cooling circuit 130 and configured to circulate fuel through the cooling circuit 130 generally in the direction indicated by the arrows shown in FIG. 2. In this way, fuel flows generally from the first conduit 422, to the cooling passage 230, to the second conduit 426, to the third conduit 434, and back to the first conduit 422. In the particular example provided, the first pump 126 is coupled to the cooling circuit 130 at a juncture of the supply conduit 418, the first conduit 422, and the third conduit 434, such that the first pump 126 intakes fuel from the supply conduit 418 and the third conduit 434 and outputs fuel to the first conduit 422. It is understood that the first pump 126 can be located in other locations and additional elements, such as one-way valves (not shown) can be used to ensure proper directional circulation of the fuel through the cooling circuit 130.

The thermostat 438 can be disposed fluidly in-line with the second conduit 426, fluidly between the outlet 238 of the cooling passage 230 and the inlet 450 of the heat exchanger 430. The bypass conduit 442 can be fluidly coupled to the thermostat 438 and the third conduit 434. In a first mode, the thermostat 438 can permit fuel to flow from the outlet 238 of the cooling passage 230 to the third conduit 434, through the bypass conduit 442. In this first mode, the thermostat 438 can prevent the fuel from flowing through the heat exchanger 430. In a second mode (shown in FIG. 2), the thermostat 438 can permit fuel to flow from the outlet 238 of the cooling passage 230 to the inlet 450 of the heat exchanger 430. In this second mode, the thermostat 438 can prevent fuel from flowing through the bypass conduit 442. While not specifically shown, the thermostat 438 can also have additional or intermediate modes to modulate the amount of fuel that flows through the heat exchanger 430 and bypass conduit 442. The thermostat 438 can be constructed in any suitable manner to switch between modes, such as an electronic actuator (not shown) or a temperature activated valve for example. Where an electronic actuator (not shown) is used, the control system 414 can switch the thermostat 438 between modes. The first mode can be the default mode and the thermostat 438 can switch to the second mode when the temperature of the fuel exiting the engine block 210 is greater than a predetermined temperature, though other configurations can be used.

The fuel delivery system 134 can include a fuel delivery conduit 510, and a fuel delivery device 514. The fuel delivery system 134 can also include a third pump 518. In the particular example provided, the fuel delivery conduit 510 is coupled to the third conduit 434 to receive fuel therefrom, downstream of the heat exchanger 430. In an alternative construction, not specifically shown, the fuel delivery conduit 510 is coupled to the second conduit 426 to receive fuel therefrom, upstream of the heat exchanger 430. In another alternative construction, not specifically shown, the fuel delivery conduit 510 is coupled to the first conduit 422 to receive fuel therefrom, upstream of the engine block 210. In yet another construction, not specifically shown, the fuel delivery conduit 510 can be coupled to the supply conduit 418 to receive fuel therefrom. The fuel delivery conduit 510 is coupled to the fuel delivery device 514 to supply fuel from the cooling circuit 130 to the fuel delivery device 514. The fuel delivery device 514 is configured to selectively supply fuel to the combustion chamber 316. The fuel delivery device 514 can be configured to supply the fuel directly into the combustion chamber 316, as indicated by the representation of the fuel delivery device 514 using solid lines, or the fuel delivery device 514 can supply the fuel to an air-fuel mixing chamber 317 at or upstream of the intake valve 318, as indicated by the representation of the fuel delivery device 514 using dashed lines. The fuel delivery device 514 can be any suitable device for introducing fuel to the combustion chamber, such as a fuel injector for example. The third pump 518 can be located fluidly in-line with the fuel delivery conduit 510 and can pump fuel from the cooling circuit 130 to the fuel delivery device 514. The third pump 518 can be any type of pump suitable for pumping fuel and can be operated by an electrical motor (not shown). The third pump 518 can be configured to increase the pressure of the fuel supplied to the fuel delivery device 514, relative to the pressure of the fuel in the cooling circuit 130.

In the particular example provided, the second pump 410 is disposed fluidly in-line with the supply conduit 418 and configured to pump fuel from the fuel tank 122, to the cooling circuit 130. The second pump 410 can be any type of pump suitable for pumping fuel and can be operated by an electrical motor (not shown). The control system 414 can include a control module 610 and a sensor 614. The sensor 614 can be configured to measure an operating temperature of the engine 114 and send a signal to the control module 610 indicating the engine operating temperature. In the particular example provided, the sensor 614 is coupled to the third conduit 434 and configured to measure the temperature of the fuel in the third conduit 434. It is understood that the sensor 614 can be located elsewhere along the cooling circuit 130 to measure the temperature of the fuel at a different position, such as at the second conduit for example 426. Alternatively, the sensor 614 can be configured to measure the temperature of a component of the engine 114, such as the engine block 210 for example. The sensor 614 can be any suitable type of sensor for measuring temperature, such as a thermocouple for example. While not specifically shown, the control system 414 can include additional sensors configured to measure temperature, pressure, flowrate, or any other suitable metric.

The control module 610 can determine the operating temperature of the engine 114 based on the temperature reading received from the sensor 614. The control module 610 can be configured to control the operation of the first pump 126 based on the operating temperature of the piston, i.e. based on the reading of the sensor 614. For example, the control module 610 can be configured to adjust the flowrate of the first pump 126 based on the operating temperature. For example, the control module 610 can be configured to adjust the amount of electrical power supplied to the first pump 126 or the amount of time the first pump 126 receives power (e.g. duty cycle of the first pump 126). When the first pump 126 is mechanically driven, the control module 610 can be configured to adjust a device (not shown) between the first pump 126 and the crankshaft, such as a clutch or gearbox for example. The control module 610 can increase the flowrate when the operating temperature is greater than a predetermined value, or can vary the flowrate in accordance with the operating temperature. While not specifically shown, the control module 610 can also be coupled to the thermostat 438 to control the operation of the thermostat 438 as described above. In these ways, the control module 610 can act to control the amount of heat absorbed by the fuel and rejected through the heat exchanger. It is understood that the control module 610 can also be configured to control other elements of the engine 114, such as the air-fuel mixture, ignition timing, timing of the intake and exhaust valves 318, 322, or the second and third pumps 410, 518 for example. With reference to the second and third pumps 410, 518, the control module 610 can be configured to adjust the amount of electrical power supplied to the second and third pumps 410, 518 or the amount of time the second and third pumps 410, 518 receive power (e.g. duty cycle of the second and third pumps 410, 518).

In operation, the first or second pump 126, 410, can draw an amount of fuel from the fuel tank 122, through the supply conduit 418 and into the first conduit 422. The first pump 126 circulates fuel through the cooling circuit 130. The fuel flowing through the supply conduit 418 is of a supply temperature that is relatively cold. The fuel from the supply conduit 418 mixes with fuel in the cooling circuit at the first conduit 422 such that the fuel in the first conduit 422 is of a first temperature. The first temperature is generally greater than the supply temperature. The fuel flows from the first conduit 422 through inlet 234 and into the cooling passage 230 of the engine block 210 to generally envelop the piston cylinders 226 in a jacket of fuel. While flowing around the piston cylinders 226, the fuel absorbs heat from the engine block 210. The fuel then exits the engine block 210 through outlet 238 and enters the second conduit 426 at a second temperature. The second temperature is greater than the first temperature.

If the temperature of the fuel exiting the engine block 210 is less than the predetermined temperature for the thermostat 438, then the thermostat 438 remains in the first mode to direct the fuel through the bypass conduit 442 to bypass the heat exchanger 430 and enter the third conduit 434. Once the temperature of the fuel exiting the engine block 210 reaches the predetermined temperature for the thermostat 438, then the thermostat 438 switches to the second mode to permit flow of the fuel through the heat exchanger 430. Air or another fluid, indicated by arrow 710, passes across the heat exchanger 430 to absorb heat from the fuel. The fuel then exits the heat exchanger 430 through outlet 454 to enter the third conduit 434. The fuel flowing through the third conduit 434 is of a third temperature. When the thermostat 438 is in the first mode, the third temperature is generally equal to the second temperature. When the thermostat 438 is in the second mode, or otherwise not included in the cooling circuit 130, the third temperature is less than the second temperature. The fuel then flows from the third conduit 434 to the first conduit 422 to mix with the fuel from the supply conduit 418, such that the fuel in the supply conduit is of the first temperature, the first temperature being greater than the supply temperature and less than the third temperature. Since the supply temperature can depend on the ambient temperatures surrounding the fuel tank 122, and the first temperature is a result of the blending of the fuels of the supply temperature and the third temperature, the first temperature can be lower when ambient temperatures are lower. Thus, the fuel is able to absorb more heat from the engine block 210 when ambient temperatures are lower, and a greater amount of heat rejection can take place from the heat exchanger 430 when the temperatures of the air 710 are lower. The first pump 126 can circulate the fuel in this fashion about the cooling circuit 130.

When fuel is needed for combustion, the fuel delivery device 514 is operated to open and permit fuel to flow from the cooling circuit 130, through the fuel delivery conduit 510, and into the combustion chamber 316. Since the second pump 410 need only pump an amount of fuel equal to the amount of fuel removed from the cooling circuit 130 by the fuel delivery system 134, the second pump 410 can be a relatively low flow rate relative to the first pump 126. It is understood that the first pump 126 can be configured to draw fuel from the fuel tank 122 without the aid of the second pump 410, though in the example provided, the second pump 410 can be optionally used to prevent cavitation at the first pump 126. For example in the present example provided, the first pump 126 can have a flow rate of approximately 10,350 kg/hr and the second pump 410 can have a flow rate of approximately 240 kg/hr, though these flow rates and the ratio between them can be different depending on the specific application. As discussed above, the flow rate of the first pump 126 can also optionally be controlled by the control module 610.

As discussed above, the third pump 518 can draw the fuel from the cooling circuit 130 and can increase the pressure of the fuel before entering the fuel delivery device 514. The fuel delivery device 514 can be configured to atomize the fuel to aid in its mixing with air to form an air-fuel mixture in the combustion chamber 316. When the fuel delivery conduit 510 is coupled to the third conduit 434, the temperature of the fuel supplied by the fuel delivery device 514 to the combustion chamber 316 can be the third temperature. When the fuel delivery conduit 510 is coupled to the second conduit 426, the temperature of the fuel supplied by the fuel delivery device 514 to the combustion chamber 316 can be the second temperature. Since the second and third temperatures are generally higher than the supply temperature of the fuel tank 122, the fuel entering the combustion chamber 316 is a temperature that is closer to the fuel's boiling point. Thus, less energy is used during combustion to vaporize the fuel, which can increase the efficiency of the engine 114. Additionally, since the fuel supplied to the combustion chamber 316 absorbed heat while passing through the engine block 210, some of that heat is then expelled out of the engine 114 through the exhaust valve 322 and the exhaust system (not shown). The heat rejected through the exhaust valve 322 and exhaust system is illustrated by arrow 714. The amount of heat 714 rejected out of the exhaust valve 322 is especially increased in colder ambient environments, as the difference between the supply temperature and the temperature of the fuel delivered to the combustion chamber 316 is greater. Thus, the fuel/cooling system 118 of the present disclosure removes heat from the engine block 210 by a common fluid (i.e. the fuel) and rejects that heat from the fuel through both the heat exchanger 430 and the exhaust system of the engine 114.

Figure 4:
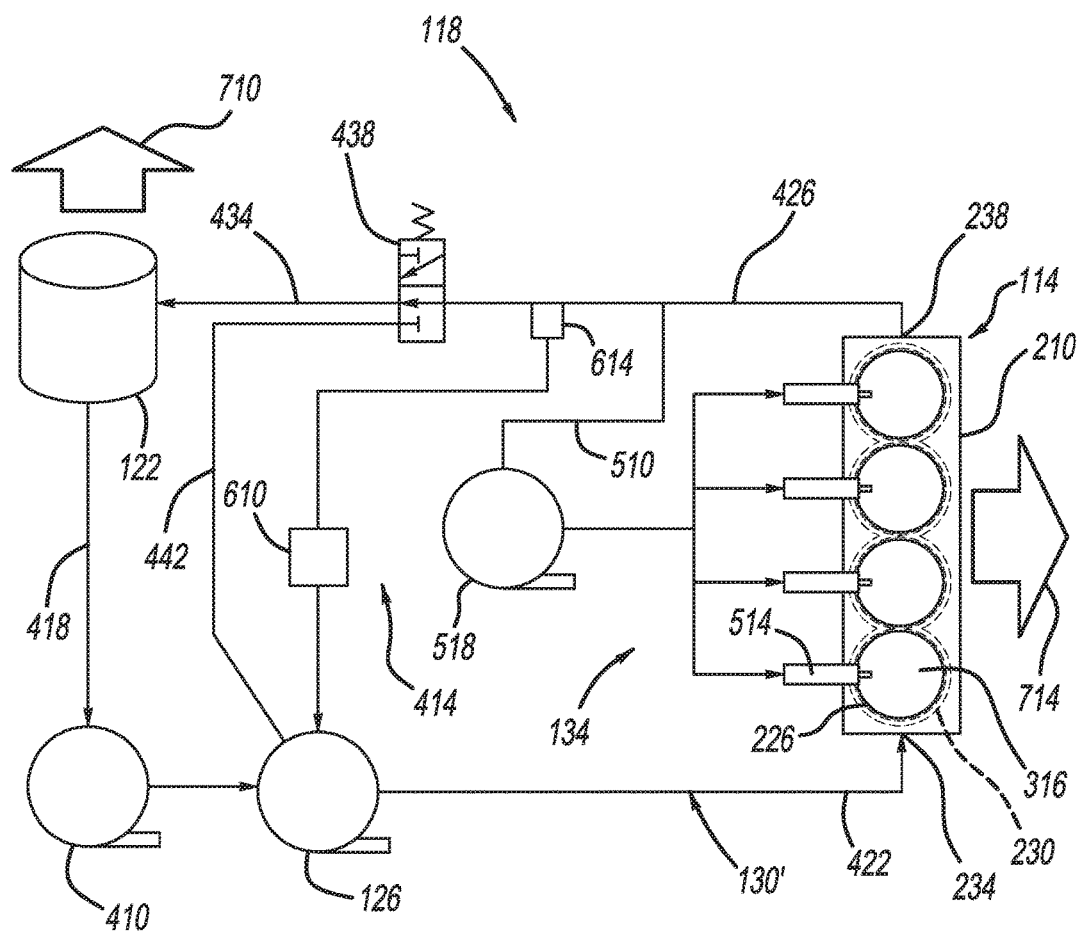
FIG. 4. is a schematic of the piston engine and fuel system of a second construction.

With reference to FIG. 4, the engine 114 and the fuel/cooling system 118 are illustrated as having a cooling circuit 130' of a second construction. The cooling circuit 130' can be similar to the cooling circuit 130 (FIG. 2) except as illustrated and described below. Accordingly, the descriptions of similarly numbered elements are incorporated herein by reference and only differences will be described in detail.

In the cooling circuit 130', the second conduit 426 can be coupled to the outlet 238 and the thermostat 438 and configured to permit fuel to flow from the outlet 238 to the thermostat 438. The bypass conduit 442 can be coupled to the thermostat 438 and the first conduit 422 (e.g. via the first pump 126) to permit fuel to flow from the thermostat 438 to the first conduit 422, such as through the first pump 126. The third conduit 434 can be coupled to the thermostat 438 and the fuel tank 122 and configured to permit fuel to flow from the thermostat 438 to the fuel tank 122. When the thermostat 438 is in the first mode, the thermostat can permit fuel to flow from the outlet 238 of the cooling passage 230 to the first conduit 422, through the bypass conduit 442. In this first mode, the thermostat 438 can prevent fuel in the second conduit 426 from flowing through the third conduit 434 to the fuel tank 122.

In a second mode (shown in FIG. 4), the thermostat 438 can permit fuel to flow from the outlet 238 of the cooling passage 230 to the fuel tank 122. In this second mode, the thermostat 438 can prevent fuel in the second conduit 426 from flowing through the bypass conduit 442. As described above with reference to FIG. 2, the thermostat 438 can have additional or intermediate modes and can be switched between modes by any suitable means, such as the control system 414. While not specifically shown, a heat exchanger similar to the heat exchanger 430 (FIG. 2) can be disposed in-line with the third conduit 434 between the thermostat 438 and the fuel tank 122 and can be in fluid communication with the thermostat 438 and the fuel tank 122.

The fuel delivery conduit 510 can be coupled to the second conduit 426 to receive fuel therefrom. In an alternative construction, not specifically shown, the fuel delivery conduit 510 can be coupled to the first conduit 422 to receive fuel therefrom, upstream of the engine block 210. In yet another construction, not specifically shown, the fuel delivery conduit 510 can be coupled to the supply conduit 418 to receive fuel therefrom.

In operation, the cooling circuit 130' can operate similarly to the cooling circuit 130 (FIG. 2) except as described below. The fuel in the cooling circuit 130' can be circulated through the first conduit 422, the cooling passage 230, the second conduit 426, and the bypass conduit 442 back to the first conduit 422 until the operating temperature of the engine 114 is greater than a predetermined temperature for the thermostat 438. Once the operating temperature is greater than the predetermined temperature for the thermostat 438, then the thermostat 438 can switch to the second mode to permit flow of fuel through the third conduit 434 to the fuel tank 122. The relatively cold fuel in the fuel tank 122 can act as a heat sink to absorb heat from the fuel exiting the third conduit 434. A second fluid, such as air for example can flow across the fuel tank 122 to remove heat from the fuel tank 122, as indicated by arrow 710. In the alternative construction where the heat exchanger (not shown) is disposed between the thermostat 438 and the fuel tank 122, the second fluid can flow across the heat exchanger similar to the heat exchanger 430 (FIG. 2) to remove heat from the fuel before it enters the fuel tank 122.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A cooling system for an internal combustion engine, the cooling system comprising:
   an engine block at least partially defining a combustion chamber and a cooling passage, the cooling passage extending through the engine block;
   a compression device received in the engine block to partially define the combustion chamber, the compression device being movable within and relative to the engine block;
   a cooling circuit in fluid communication with the cooling passage;
   a first pump in fluid communication with the cooling circuit and configured to circulate a fuel through the cooling circuit and the cooling passage; and
   a fuel delivery device in fluid communication with the cooling circuit and configured to deliver the fuel to the combustion chamber, wherein the fuel delivery device is fluidly coupled to the cooling circuit at a location downstream of the cooling passage and upstream of the first pump.

2. The cooling system of claim 1, further comprising a fuel tank and a supply conduit, wherein the cooling circuit includes a first conduit and a second conduit, the first conduit being fluidly coupled to an inlet of the cooling passage, the second conduit being fluidly coupled to an outlet of the cooling passage, the supply conduit being coupled to the cooling circuit to supply fuel from the fuel tank to the first conduit.

3. The cooling system of claim 2, further comprising a heat exchanger in fluid communication with the cooling circuit and configured to receive fuel from the second conduit.

4. The cooling system of claim 3, wherein the fuel delivery device is fluidly coupled to the cooling circuit at a location between an outlet of the heat exchanger and an inlet of the first pump.

5. The cooling system of claim 3, wherein the fuel delivery device is fluidly coupled to the cooling circuit at a location between the outlet of the cooling passage and an inlet of the heat exchanger.

6. The cooling system of claim 3, further comprising a thermostat fluidly coupled to the cooling circuit at a location between the outlet of the cooling passage and an inlet the heat exchanger.

7. The cooling system of claim 2, further comprising a second pump in fluid communication with the supply conduit and configured to pump fuel from the fuel tank to the cooling circuit.

8. The cooling system of claim 2, wherein the second conduit is fluidly coupled to the fuel tank to return fuel to the fuel tank.

9. The cooling system of claim 8, wherein the fuel delivery device is fluidly coupled to the second conduit at a location between the cooling passage and the fuel tank.

10. The cooling system of claim 1, further comprising a second pump disposed in a fuel delivery conduit extending from the cooling circuit to the fuel delivery device.

11. The cooling system of claim 1, further comprising a control module configured to control a flow rate of the first pump based on an operating temperature of the engine.

12. The cooling system of claim 1, wherein the cooling passage surrounds at least a portion of the combustion chamber.

13. The cooling system of claim 1, wherein the fuel delivery device is configured to deliver the fuel to a mixing chamber that is fluidly coupled to the combustion chamber.

14. The cooling system of claim 1, wherein the fuel delivery device is configured to deliver the fuel directly into the combustion chamber.

15. The cooling system of claim 1, further comprising:
   a fuel tank;
   a supply conduit configured supply fuel from the fuel tank to the cooling circuit; and
   a return conduit configured to return fuel from the cooling passage to the supply conduit, wherein the fuel delivery device is fluidly coupled to the return conduit at a location upstream of a junction between the supply conduit and the return conduit where fuel from the fuel tank is mixed with fuel from the return conduit.

16. A cooling system for an internal combustion engine, the cooling system comprising:
   an engine block at least partially defining a combustion chamber and a cooling passage, the cooling passage having an inlet and an outlet and extending through the engine block;
   a heat exchanger having an inlet and an outlet;
   a cooling circuit including a first conduit, a second conduit, and a third conduit, the first conduit being coupled to the inlet of the cooling passage, the second conduit being coupled to the outlet of the cooling passage and the inlet of the heat exchanger, the third conduit being coupled to the first conduit and the outlet of the heat exchanger;
   a fuel tank configured to hold a volume of a fuel;
   a supply conduit coupled to the fuel tank and the first conduit;
   a first pump configured to circulate the fuel through the cooling circuit; and
   a fuel delivery device in fluid communication with the cooling circuit and configured to deliver the fuel to the combustion chamber, wherein the fuel delivery device is fluidly coupled to the cooling circuit at a location downstream of the cooling passage and upstream of the first pump.

17. The cooling system of claim 16, wherein the fuel delivery device is fluidly coupled to the cooling circuit at a location downstream of the heat exchanger and upstream of the first pump.

18. The cooling system of claim 16, wherein the fuel delivery device is fluidly coupled to the cooling circuit at a location downstream of the cooling passage and upstream of the heat exchanger.

19. The cooling system of claim 16, further comprising a thermostat fluidly coupled to the cooling circuit at a location between the outlet of the cooling passage and the inlet of the heat exchanger.

20. The cooling system of claim 16, further comprising a second pump in fluid communication with the supply conduit and configured to pump the fuel from the fuel tank to the cooling circuit.

21. The cooling system of claim 16, further comprising a second pump disposed in a fuel delivery conduit extending from the cooling circuit to the fuel delivery device.

22. The cooling system of claim 16, further comprising a control module configured to control a flow rate of the first pump based on an operating temperature of the engine.

23. The cooling system of claim 16, wherein the cooling passage surrounds at least a portion of the combustion chamber.

24. The cooling system of claim 16, wherein the fuel delivery device is configured to deliver the fuel to a mixing chamber that is fluidly coupled to the combustion chamber.

25. The cooling system of claim 16, wherein the fuel delivery device is configured to deliver the fuel directly into the combustion chamber.

26. The cooling system of claim 16, further comprising a cylinder head coupled to the engine block and at least partially defining a second cooling passage.

27. The cooling system of claim 16, further comprising a return conduit configured to return fuel from the cooling passage to the supply conduit, wherein the fuel delivery device is fluidly coupled to the return conduit at a location upstream of a junction between the supply conduit and the return conduit where fuel from the fuel tank is mixed with fuel from the return conduit.

28. A method of cooling an internal combustion engine, the method comprising:
 circulating fuel through a cooling circuit including the steps of:
  sending the fuel through a cooling passage using a first pump to transfer heat from the engine to the fuel, the cooling passage being defined by at least one of an engine block and a cylinder head of the engine;
  flowing the fuel from the cooling passage to a heat exchanger to release heat from the fuel; and
  flowing the fuel from the heat exchanger to the cooling passage;
 diverting a portion of the fuel from the cooling circuit to a fuel delivery device, wherein the portion of the fuel is diverted from the cooling circuit at a location downstream of the cooling passage and upstream of the first pump;
 delivering the portion of the fuel to a combustion chamber of the engine using the fuel delivery device; and
 combusting the portion of the fuel in the combustion chamber.

29. The method of claim 28 further comprising supplying an additional amount of fuel from a fuel tank to the cooling circuit.

30. The method of claim 29, further comprising mixing the additional amount of fuel with the fuel that is within the cooling circuit before flowing the fuel through the cooling passage.

31. The method of claim 28, further comprising controlling a flowrate of the fuel in the cooling circuit based on an operating temperature of the engine.

32. The method of claim 28, further comprising:
 supplying fuel from a fuel tank to the cooling circuit using a supply conduit; and
 returning fuel from the cooling passage to the supply conduit using a return conduit, wherein the portion of the fuel is diverted from the return conduit at a location upstream of a junction between the supply conduit and the return conduit where fuel from the fuel tank is mixed with fuel from the return conduit.

* * * * *